United States Patent
Vasshus et al.

(10) Patent No.: US 8,348,623 B2
(45) Date of Patent: Jan. 8, 2013

(54) APPARATUS AND A METHOD FOR REGULATION OF THE ENERGY POTENTIAL IN A FLUID COLUMN LOCATED WITHIN A PIPELINE

(75) Inventors: Jan Kristian Vasshus, Sandnes (NO); Trond Melhus, Sandnes (NO)

(73) Assignee: Energreen AS, Sandnes (NO)

( * ) Notice: Subject to any disclaimer, the term of this patent is extended or adjusted under 35 U.S.C. 154(b) by 806 days.

(21) Appl. No.: 12/307,329

(22) PCT Filed: Jun. 28, 2007

(86) PCT No.: PCT/NO2007/000240
§ 371 (c)(1),
(2), (4) Date: Mar. 11, 2009

(87) PCT Pub. No.: WO2008/004880
PCT Pub. Date: Jan. 10, 2008

(65) Prior Publication Data
US 2009/0314353 A1    Dec. 24, 2009

(30) Foreign Application Priority Data

| Jul. 3, 2006 | (NO) | 20063069 |
| Oct. 27, 2006 | (NO) | 20064944 |
| Jun. 20, 2007 | (NO) | 20073138 |

(51) Int. Cl.
F04B 41/06 (2006.01)
F01C 19/00 (2006.01)
F03C 2/00 (2006.01)
F03C 4/00 (2006.01)
F04C 15/00 (2006.01)
F04C 27/00 (2006.01)
F17D 1/16 (2006.01)
F17D 1/18 (2006.01)
F03B 13/00 (2006.01)
H02P 9/04 (2006.01)

(52) U.S. Cl. .................. 417/3; 418/104; 137/14; 290/54
(58) Field of Classification Search .................... 290/54; 137/14; 417/3, 408, 409, 493, 377; 418/104, 418/149
See application file for complete search history.

(56) References Cited

U.S. PATENT DOCUMENTS 3,575,535 A * 4/1971 Bickar .......................... 417/244
(Continued)

FOREIGN PATENT DOCUMENTS

DE    2719651    9/1978
(Continued)

OTHER PUBLICATIONS

Machine translation of Jp 2006-118405 to Matsumori et al.*
(Continued)

*Primary Examiner* — Anh Mai
*Assistant Examiner* — Zachary J Snyder
(74) *Attorney, Agent, or Firm* — GableGotwals

(57) ABSTRACT

The present invention describes an apparatus (1) and a method for use in regulation of the energy potential in a fluid column located within a pipeline (13), the apparatus (1) including two impellers (2), either one including a rotatable shaft (6) which is provided with a plurality of vanes or plate-shaped blades (8), the impellers (2) being disposed in a housing (4) which constitutes a portion of the pipeline (13), the apparatus (1) communicating with a load (19, 21) and/or an energy source, so that the impellers (2) of the apparatus (1) are arranged to influence the movement of the fluid column within the pipeline (13), the apparatus (1) being arranged to receive the fluid column between the shafts (6) of the impellers (2), the centre axis of said shafts (6) being substantially in the same plane as wall portions of the housing (4) upstream and downstream of the vanes, whereby the rate of the fluid column through the apparatus substantially corresponds to the rate of the fluid column immediately upstream and/or downstream of the impellers (2) of the apparatus (1).

10 Claims, 8 Drawing Sheets

U.S. PATENT DOCUMENTS

| | | |
|---|---|---|
| 4,390,331 A | 6/1983 | Nachtrieb |
| 4,488,055 A | 12/1984 | Toyama |

FOREIGN PATENT DOCUMENTS

| | | |
|---|---|---|
| JP | 2006118405 | 5/2006 |
| WO | WO 99/67531 | 12/1999 |
| WO | WO 2004/061296 | 7/2004 |
| WO | WO 2007/036943 | 4/2007 |

OTHER PUBLICATIONS

PCT Office, "Notification of Transmittal of International Preliminary Report On Patentability," PCT Office, (Jun. 27, 2008).

PCT Office, "Written Opinion Of the International Preliminary Examining Authority," PCT Office, (May 28, 2008).

PCT Office, "Written Opinion of the International Searching Authority," PCT Office, (Oct. 15, 2007).

* cited by examiner

APPARATUS AND A METHOD FOR REGULATION OF THE ENERGY POTENTIAL IN A FLUID COLUMN LOCATED WITHIN A PIPELINE

CROSS-REFERENCE TO PENDING APPLICATIONS

This application is based on PCT Patent Application No. NO2007/000240, filed on Jun. 28, 2007, which was based on Norwegian Patent Application Nos. 20063069 filed on Jul. 3, 2006; 20064944 filed on Oct. 27, 2006 and 20073138 filed on Jun. 20, 2007.

The present invention relates to an apparatus and a method for regulation of the energy potential in a fluid column located within a pipeline. More particularly, it relates to the integration of an apparatus including a drive means into a portion of the pipeline, the drive means being arranged to influence the movement of the fluid column within the pipeline.

Thus, the apparatus is arranged to produce a differential pressure between portions of the fluid column located upstream and downstream of the apparatus. The differential pressure could be positive or negative.

In those cases in which the differential pressure is positive, that is to say the fluid pressure downstream of the apparatus is greater than the fluid pressure upstream of the apparatus, the fluid will be supplied with energy from the apparatus. This could be achieved by means of any pumping device of a kind known per se.

In those cases in which said differential pressure is negative, that is to say the fluid pressure downstream of the apparatus is smaller than the fluid pressure upstream of the apparatus, the apparatus will be supplied with energy from the fluid. In the latter case the apparatus could be connected to a load, such as, but not limited to, a generator for the production of electrical current.

Thus, the present invention relates to an apparatus, which is arranged, among other things, both to supply energy to a fluid column moving within a pipeline and to be supplied with energy from a fluid column moving within a pipeline.

By the term "fluid column" is meant in this document a fluid filling the internal cross-sectional area of the pipe. Preferably, the fluid is incompressible and may be, for example, but not limited to, water or other liquids. The fluid could also be a gas.

In what follows, a pressure reduction will be discussed among other things, that is to say the production of a negative differential pressure in a liquid flow, and then in particular a water flow. However, it will be understood that the apparatus according to the present invention could be used to reduce the pressure of a very large number of other fluids flowing in a pipeline. One example of such a fluid is a fluid which is produced in the petroleum industry, the fluid flowing from an underground formation up to an installation, for example at a sea surface.

In pipeline systems in which the fluid pressure is undesirably high, it is known to place one or more pressure-reducing valves to be able to reduce the pressure to the desired level. Alternatively or in addition to said pressure-reducing valve it is also usual to provide one or more so-called pressure-equalizing basin(s) to achieve said desired pressure reduction.

The water supply industry for consumption water is an example in which it is often imperative to use pressure-reducing means in the form of one or more pressure-reducing valve(s) and/or pressure-equalizing basin(s) to ensure that the water pressure in the pipeline network does not exceed a predetermined level.

From the American U.S. Pat. No. 4,390,331 is known a so-called lobe pump, which is arranged to be used as a pumping device or as a fluid-driven generator.

There are several drawbacks related to the above-mentioned prior art.

Pressure-equalizing basins can be constituted by open basins, vessels or containers, which are normally relatively big. Thus, such pressure-equalizing basins are resource-demanding to provide at least.

Pressure-reducing valves are considerably less resource demanding to provide than a pressure-equalizing basin. However, there is an environmental disadvantage related to the fact that it is not possible to utilize the energy that a fluid flow loses in a pressure-reducing valve.

To be able to utilize the energy present in, for example, a water flow, it is known that some waterworks have placed one or more water turbines known per se into the water flow. In that way it has been possible for some of the energy in the water to be used for power production, for example. However, for such a water turbine to work optimally there cannot be any counterpressure downstream of the water turbine. Thus, such a water turbine requires the water to flow to, for example, an open basin.

Lobe pumps of the kind disclosed in U.S. Pat. No. 4,390,331, for example, have drawbacks related to the fluid flow which undergoes a substantial change of direction through the apparatus as the fluid is forced to flow on the "outside" of the impellers (between the vanes and the jacket of the pump chamber) and not between the impellers. This change of direction also entails that the pump chamber is exposed to erosion from any particles, which might be carried with the fluid column. In addition the vanes or "lobes" of the impellers occupy a considerable proportion (41%) of the volume within the pump chamber.

Altogether the above-mentioned substantial drawbacks make a lobe pump of the kind which is disclosed in, for example, U.S. Pat. No. 4,390,331 and which is used as a motor, exhibit relatively poor efficiency, while at the same time being prone to erosion.

The invention has for its object to remedy or reduce at least one of the drawbacks of the prior art.

The object is achieved through features, which are specified in the description below and in the claims that follow.

In one aspect of the present invention there is provided an apparatus for use in regulation of the energy potential in a fluid column which is located within a pipeline, the apparatus including two impellers, each including a rotary shaft provided with a plurality of vanes or plate-shaped blades, the impellers being disposed in a housing forming a portion of the pipeline, said apparatus communicating with a load and/or an energy source, so that the impellers of the apparatus are arranged to influence the movement of the fluid column within the pipeline, the apparatus being arranged to receive the fluid column between the shafts of the impellers, the centre axis of said shafts being substantially in the same plane as the wall portions of the housing upstream and downstream of the impellers, whereby the rate of the fluid column through the apparatus substantially corresponds to the rate of the fluid column immediately upstream and/or downstream of the impellers of the apparatus.

In a preferred embodiment the drive means is arranged to be controlled between: transmitting kinetic energy from the fluid column to a load; transmitting energy from an energy source to the fluid column; and retaining at least a portion of the fluid column from movement within the pipeline.

The load could be, for example, but not limited to, a generator known per se for the production of electrical energy.

Preferably, the load could be controlled with respect to desired pressure reduction in the fluid column and/or desired energy transmission from the fluid column to the load. The load could also be controlled with respect to other control parameters, such as the liquid level in a water basin or flow rate of the fluid column.

In one embodiment at least one of the blades of each of the impellers is in substantially sealing contact with a first portion of the internal jacket surface of the housing, and at least another one of the blades of each of the impellers is in contact with a corresponding blade of the adjacent impeller, so that the two impellers may provide a barrier to movement of a portion of the fluid column exerting a pressure on the two impellers. If the drive means of the apparatus, for example impellers, is retained or restrained from rotation, it could provide a barrier to movement of at least a portion of the fluid column. Thus, the apparatus according to the present invention could also be used as a shut-off valve or as a choke valve.

In one embodiment the apparatus is further provided with an elongated dividing element, which is placed in at least a portion of the apparatus. In a preferred embodiment the longitudinal axis of the dividing element is substantially parallel to an axis extending between the inlet portion and outlet portion of the apparatus.

In one embodiment the dividing element is further provided with at least one fluid column control element or a flap, which is hinged to a portion of the dividing element to control the distribution of the fluid column between the two impellers. When the longitudinal axis of the fluid column control element is disposed coaxially to the longitudinal axis of the dividing element, the fluid column may be distributed substantially evenly between the two impellers. When the longitudinal axis of the fluid column control element is disposed at an angle relative to the centre axis of the dividing element, the fluid column will be distributed unevenly between the two impellers. In a position in which the fluid column control element extends from a portion of the dividing element to a portion of the jacket surface of the housing, the major part of the fluid column will be carried to just one of the two impellers. This is particularly useful when the fluid column is moving relatively slowly through the apparatus. By restricting the fluid column in such a way that the main part of it is passing just one vane, the rate of the fluid column and thereby the rotational speed of the vane will be increased.

The ability to direct the fluid column away from one of the two impellers has also turned out to be useful in connection with maintenance of the apparatus.

The position of the fluid column control element relative to the position of the dividing element is arranged to be controlled manually or automatically by means of a control device known per se.

In a second aspect of the present invention there is provided a method for the transmission of energy to or from a fluid column located within a pipeline, the method including the steps of:

integrating into the pipeline an apparatus in accordance with said first aspect of the invention;

selectively adjusting the apparatus in such a way that: kinetic energy is transmitted from the fluid column to a load; or that energy is transmitted from an energy source to the fluid column; or that at least a portion of the fluid column is retained from movement.

The load and the energy source are preferably located outside the apparatus, but in alternative embodiments the load and/or energy source could be within the apparatus.

Preferably, the apparatus is adjusted in such a way that the load applied to it provides a predetermined differential pressure between the pressures of the fluid column upstream and downstream of the apparatus.

In cases in which the primary object is to provide a pressure reduction in, for example, a water distribution network, a lobe pump known per se, of the kind disclosed in, for example, U.S. Pat. No. 4,390,331 could provide relatively satisfactory results.

The lobe pump could also be connected to a load such as, for example, a generator, but then with a significantly poorer efficiency relative to the apparatus according to the present invention.

However, in cases in which the primary object is to achieve the highest efficiency possible from the energy extracted from the fluid column, and/or the object is to provide a shut-off valve, an apparatus according to the description that follows, has surprisingly turned out to have substantial advantages over said lobe pump.

In what follows is described a non-limiting example of a preferred embodiment which is visualized in the accompanying drawings, in which.

Figure 1:
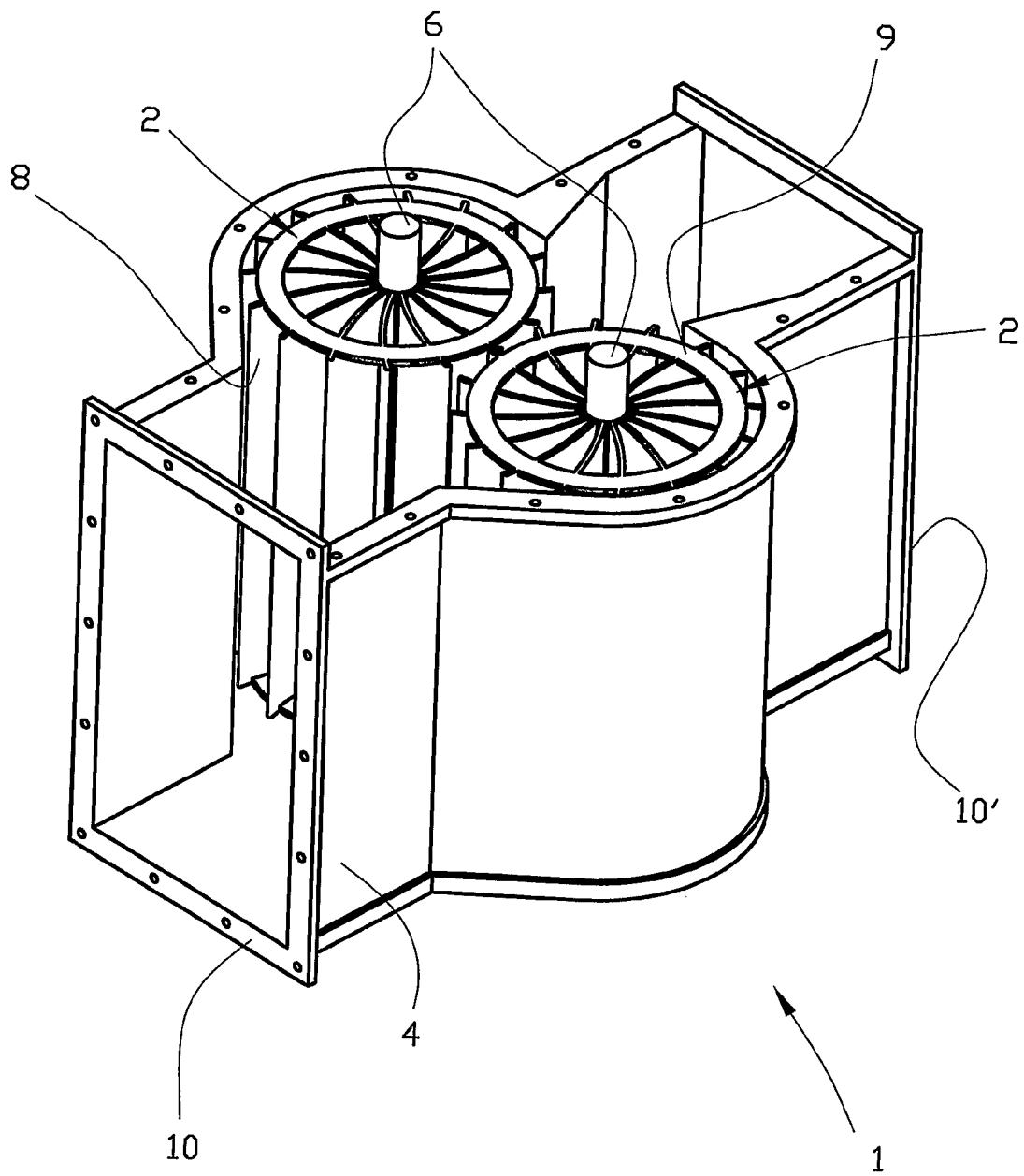
FIG. 1 shows a perspective view of an apparatus in accordance with the present invention formed by two impellers disposed within a housing.

FIGS. 1-6 show an apparatus 1 which is formed by two impellers 2 which are encased in a pump housing 4. Either one of the two impellers 2 is formed by a central shaft 6 from which extend sixteen impeller blades 8. For clarity the top portion of the pump housing 4 has been removed. However, it will be understood that the jacket portion of the pump housing 4 is fluid-tight in use, and that the apparatus 1 is connected, at either end portion 10, 10', to some form of fluid-conveying device, such as a pipeline (not shown).

At their upper and lower end portions the impeller blades 8 are attached to an annular element 9 which helps, among other things, to maintain the spacing of the vanes.

Figure 2:
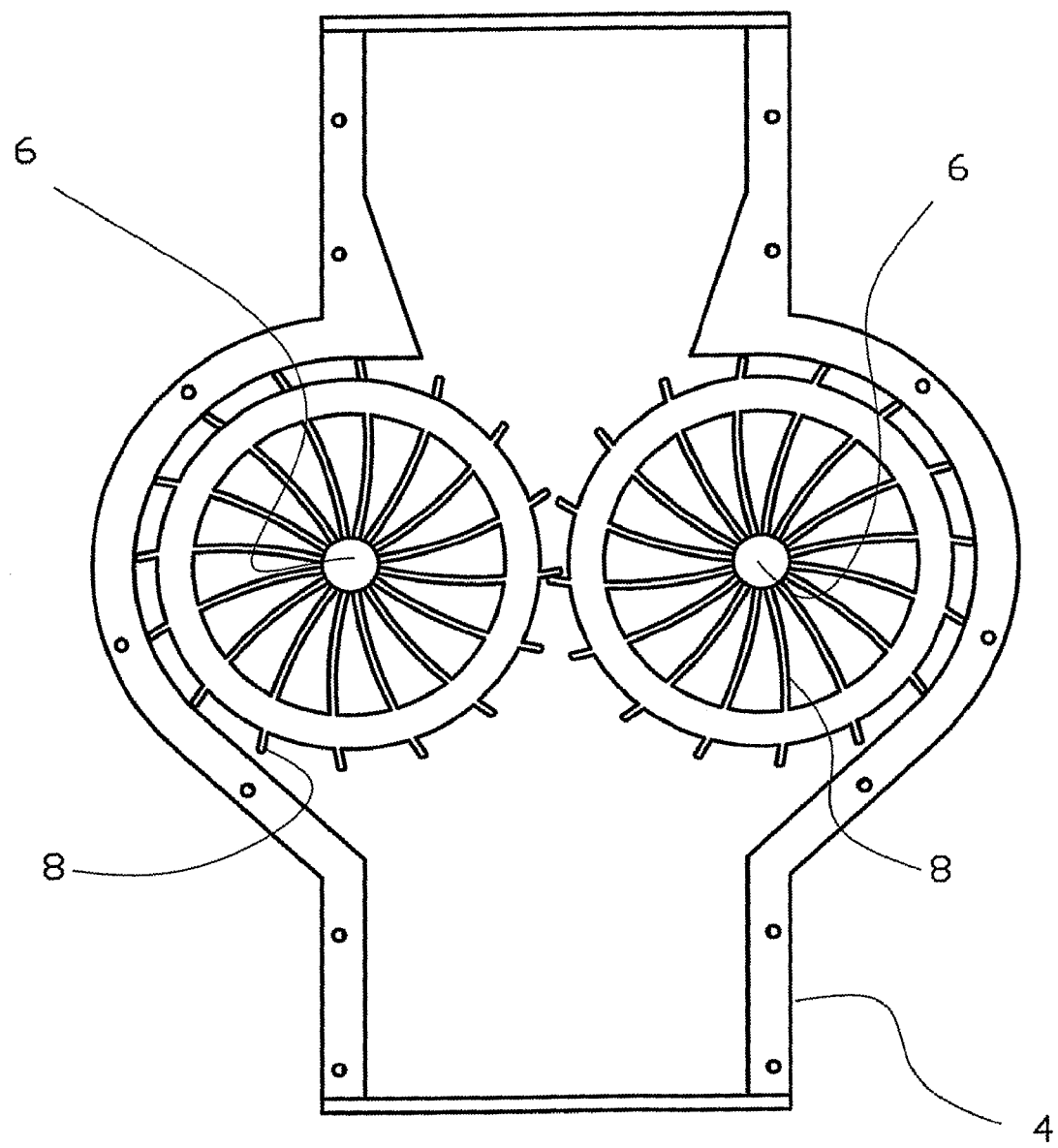
FIG. 2 shows, on a larger scale, a top view of the apparatus of FIG. 1.
Figure 3:
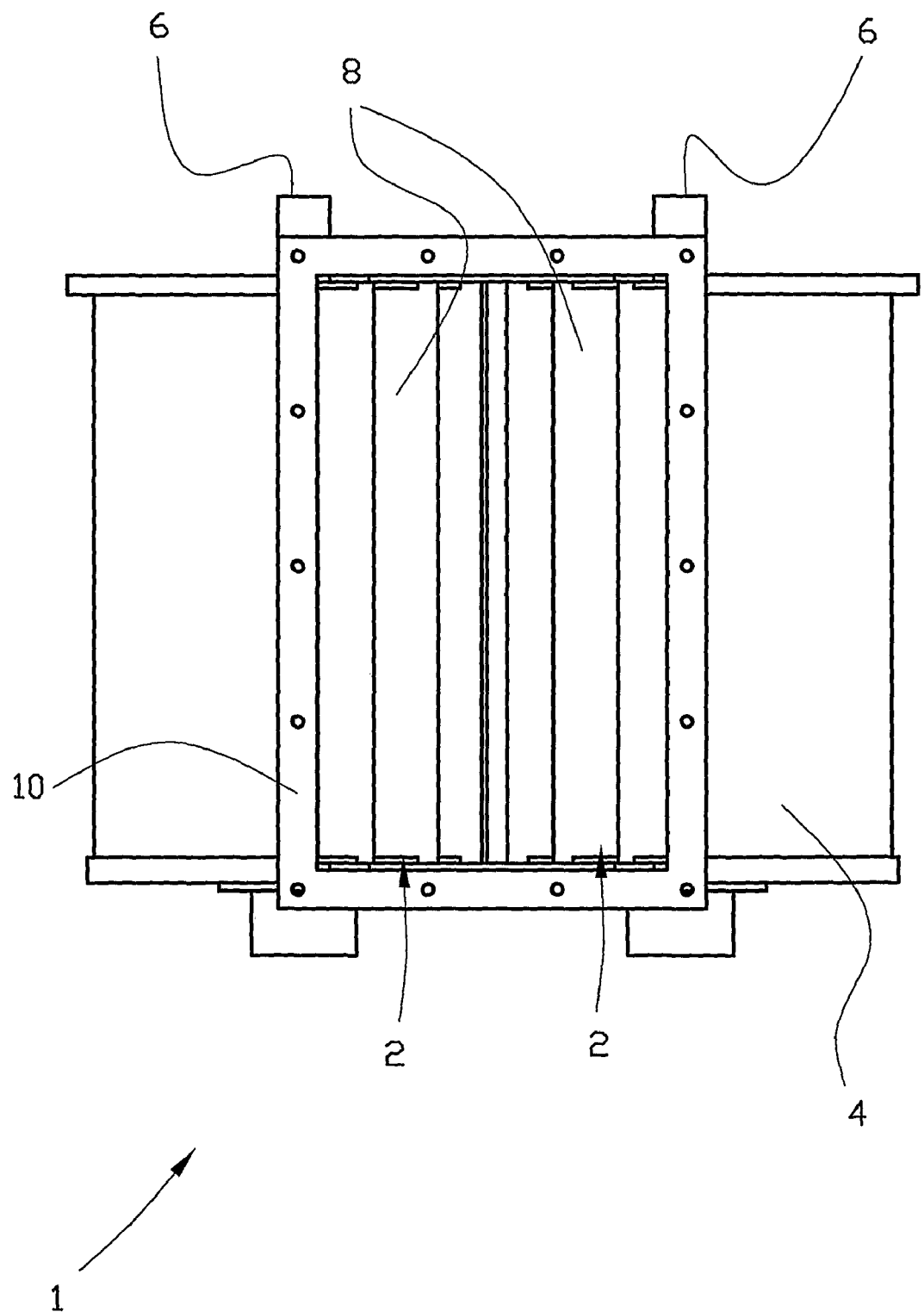
FIG. 3 shows, on a larger scale, a view of the apparatus of FIG. 1, viewed towards an inlet or an outlet portion.

A skilled person will understand that rotation of the two impellers 2 shown in FIGS. 1-3 must run synchronously in opposite directions, that is clockwise and anticlockwise, which is controlled by means of means known per se.

The longitudinal axis of the central shaft 6 is disposed substantially perpendicularly to a longitudinal axis of a fluid column (not shown) located at least upstream of the impellers 2 of the apparatus 1.

When a substantially incompressible fluid column is moving through the apparatus 1, the impellers 2 will rotate proportionally to the movement of the fluid column. This is due to sealing contact between a number of the impeller blades 8 and the pump housing 4, and sealing contact between two impeller blades 8 abutting each other. This can best be seen in FIG. 2.

Figure 4:
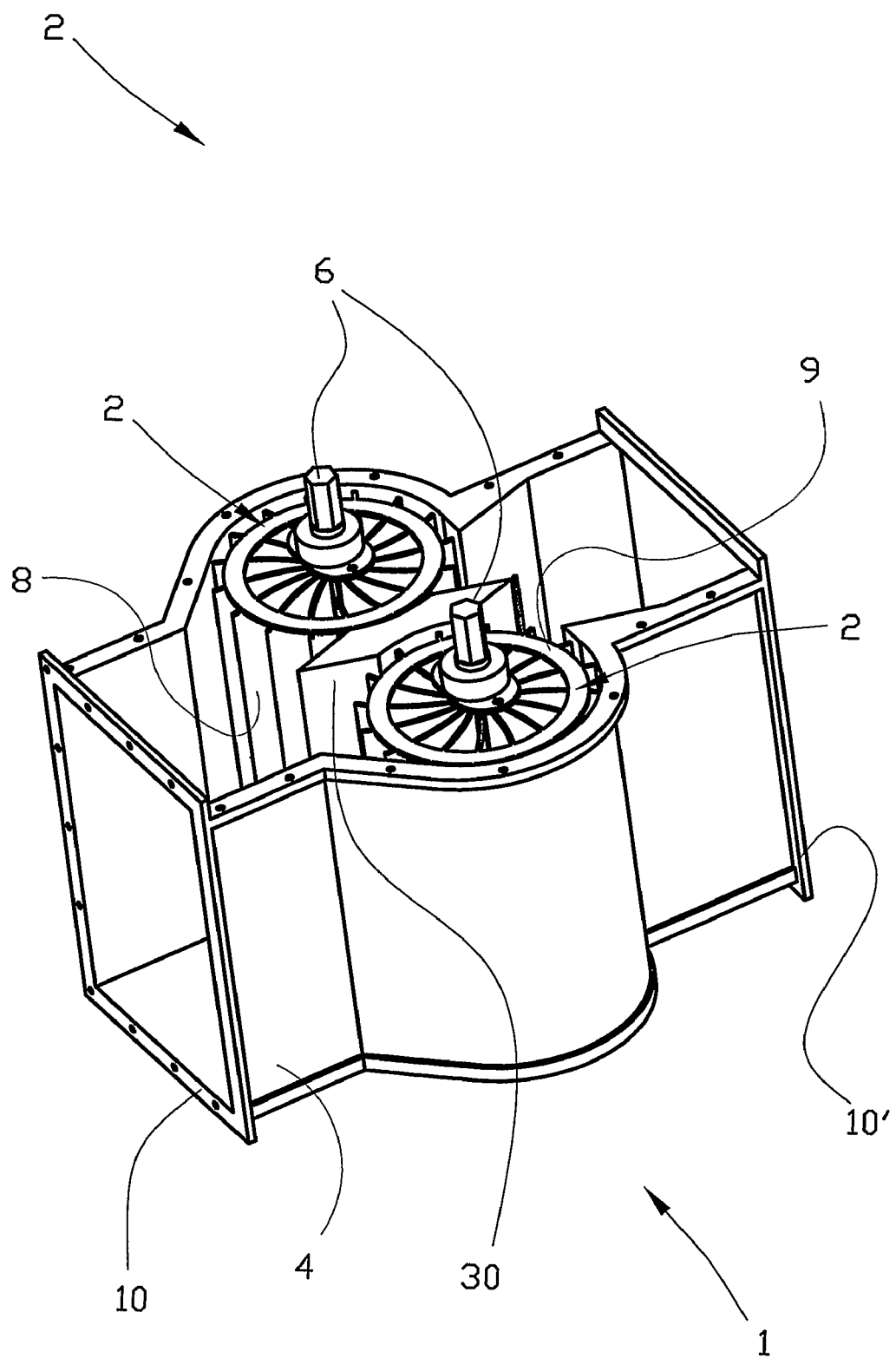
FIG. 4 shows an apparatus corresponding to that of FIG. 1, but the apparatus is further provided with a dividing element disposed between the two impellers of the apparatus.
Figure 5:
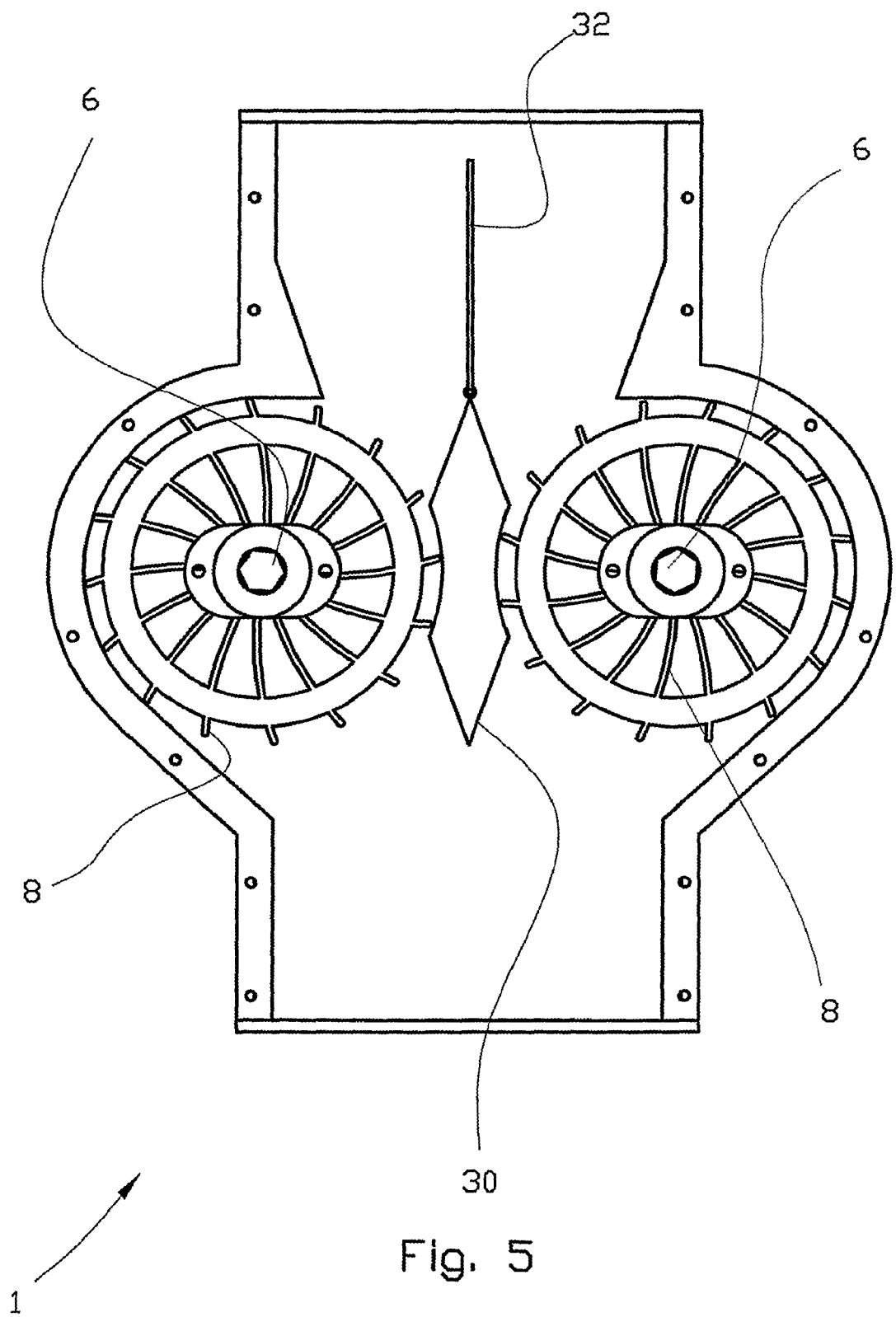
FIG. 5 shows, on a larger scale, the apparatus of FIG. 4, viewed from above, but the dividing element is further provided with a fluid column control element in the form of a flap which is in a first position.
Figure 6:
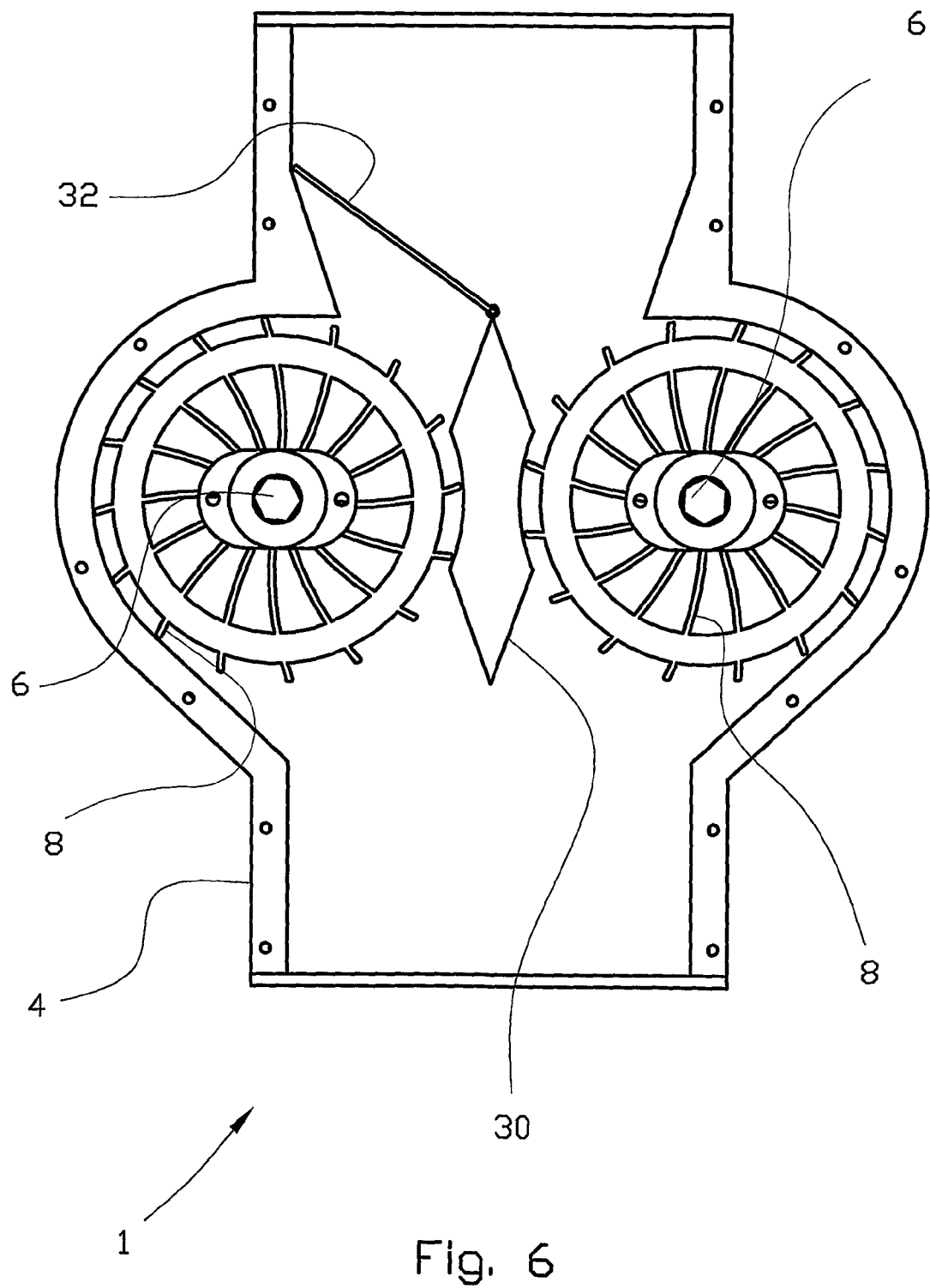
FIG. 6 shows the apparatus of FIG. 5, but the flap has been moved into a second position.

In the FIGS. 4-6 is shown an alternative embodiment of the apparatus 1 shown in the FIGS. 1-3. In FIG. 4 the apparatus is further provided with an elongated dividing element 30. The dividing element 30 is provided with a biconcave portion. The biconcave portion is complementarily adapted to the diameter of the impellers 2, so that the end portions of the impeller blades 8 may be moved substantially sealingly in contact with the dividing element 30.

With the shown embodiment of the dividing element 30 and the shown number of impeller blades 8 there are always two impeller blades 8 of each vane 2 in contact with the dividing element 30. By another design of the dividing element 30 a number of impeller blades 8 other than two, for example one or three or more, could be in contact with the dividing element 30.

It will be understood that in an alternative embodiment (not shown) the impeller blades 8 could have a small clearance to the dividing element 30 and possibly to the jacket of the housing 4. The latter solution is advantageous with respect to wear, but could not provide equally good sealing between the impellers 2 and dividing element 30 and possibly the jacket of the housing 4.

The dividing element 30 is secured to at least one portion of the jacket of the housing 4.

The dividing element 30 provides at least two properties which could be advantageous viewed in relation to the apparatus 1 shown in the FIGS. 1-3.

One of said two advantages relates to sealing between the impeller blades 8 and dividing element 30. Sealing is achieved in the same way as for sealing between the impeller blades 8 and the jacket portion of the housing 4.

The other one of said two advantages relates to the fact that the dividing element 30 eliminates the need for the impellers 2 to rotate synchronously or at equal speed.

In FIG. 5 is shown the apparatus of FIG. 4, viewed from above, but with a fluid column control element 32 in the form of a flap hinged to an end portion of the dividing element 30.

The fluid column control element 32 is arranged to be adjusted between a position as shown in FIG. 5 and a position shown in FIG. 6. It will be understood that in a preferred embodiment the fluid column control element 32 could be rotated into abutment also on the jacket surface of the apparatus opposite that shown in said figure. It will also be understood that the fluid column control element 32 could be placed in any position between said extreme positions.

In the FIGS. 5 and 6 the direction of flow of the fluid column is preferably from the top towards the bottom of the drawings.

By connecting a load 19, 21 (see FIG. 8) to at least one of the two shafts 6 of the impellers 2 in the apparatus shown in the FIGS. 1-3, the impellers 2 will work as a "brake" on the movement of the fluid column. Parts of the kinetic energy which is transmitted from the fluid column to the load 19, 21 may be utilized, in a case in which the load 19, 21 is formed by a generator, for producing electrical energy. At the same time a negative differential pressure could be provided across the apparatus 1.

In the embodiment shown in the FIGS. 4-6, a load 19, 21 will have to be connected to the shafts 6 of both impellers 2, as these are rotated independently of each other. However, a skilled person will understand that a synchronizing mechanism (not shown) could be connected to a portion of the impellers 2, for example the shafts 6, so that a load 19, 21 will have to be connected to just one of the shafts 6 of the two impellers 2.

Moreover, rotation of the impellers 2 will provide movement of the fluid column. When the fluid column is formed by a substantially incompressible fluid, the movement will be proportional to the rotation of the impellers 2. The rotation of the impellers 2 in the apparatus shown in the FIGS. 1-3 is provided by means of a force applied to at least one of the shafts 6 from a drive means, not shown, such as a motor. Thus, the fluid column could selectively be moved in the desired direction through the apparatus 1 by controlling the direction of rotation of the impellers 2. A skilled person will understand that by corresponding rotation of the impellers 2 of the apparatus 1 shown in the FIGS. 4-6, a force will have to be applied to both shafts. However, a synchronizing mechanism (not shown) could be connected to, for example, the shafts 6, so that said force is applied to just one of the two shafts 6 shown.

In one embodiment (not shown) the apparatus 1 is provided with a synchronizing device between the shafts 6 of the impellers 2, which are influenced by the position of the fluid column control element 32 in the apparatus 1. Thus, the shafts could be synchronized/connected in terms of force when the fluid control element 32 is in the mid position as shown in FIG. 5. When the fluid control element 32 is pivoted over a predetermined angle from said mid position, the synchronizing device is arranged to disengage the interconnection of the shafts 6. For example, a synchronizing device could make the left shaft 6 shown in FIG. 6 be disengaged from the right shaft 6, so that a force will only act on the right shaft 6.

If the shafts 6 of the impellers 2 are retained from rotation, movement of an incompressible fluid column will cease at least upstream of the apparatus 1.

The possibilities of selectively producing rotation of the impellers 2, both clockwise and anticlockwise, also have the positive side-effect of making it easier for any foreign bodies that might wedge in the apparatus 1 to be removed through a reciprocating movement of the fluid column. Such a movement is achieved by effecting a reciprocating clockwise and anti-clockwise rotation of each of the impellers 2.

Figure 7:
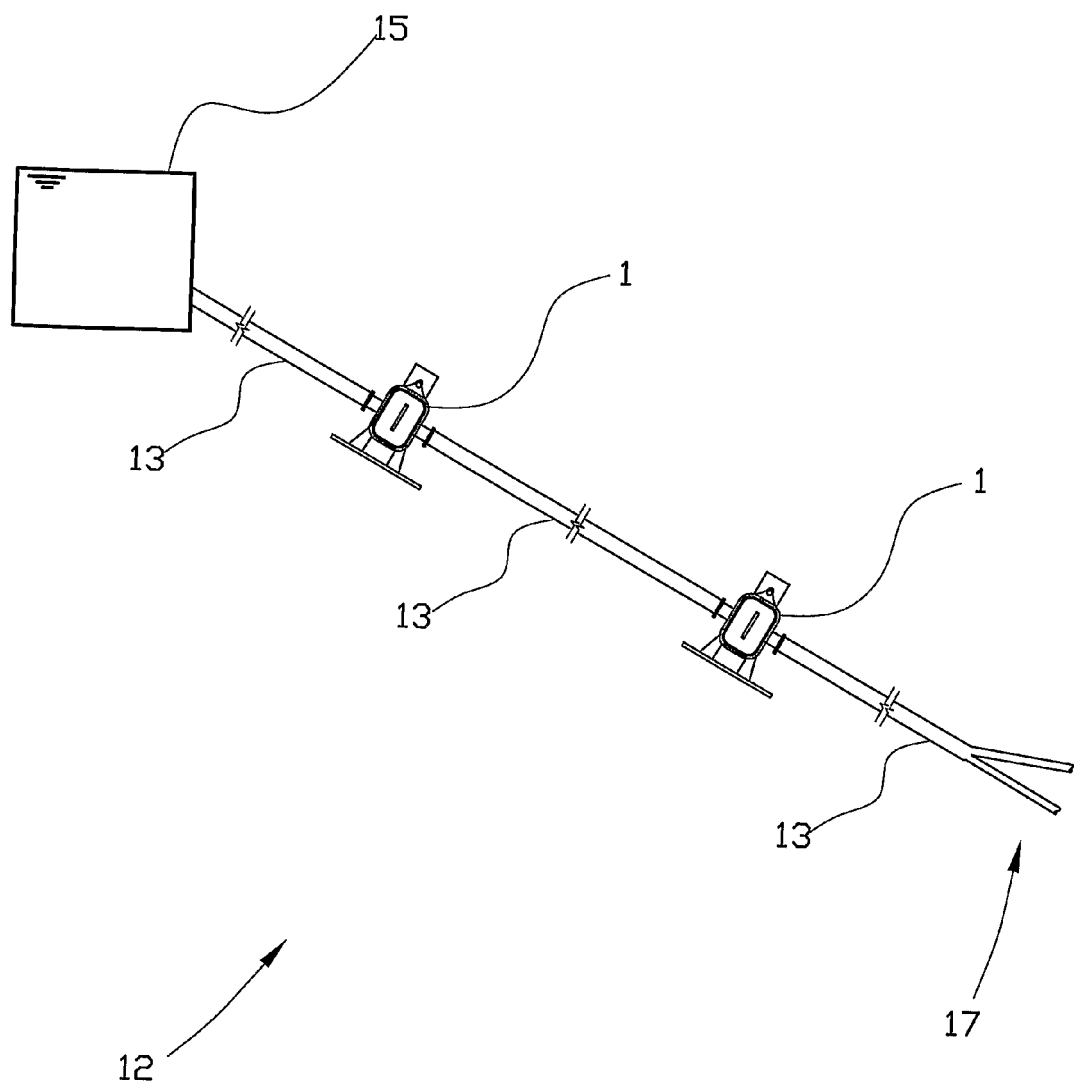
FIG. 7 shows, on a smaller scale, a principle drawing of a portion of a water supply system in a lateral view, two apparatuses in accordance with the present invention being disposed in portions of the pipeline of the water supply system.
Figure 8:
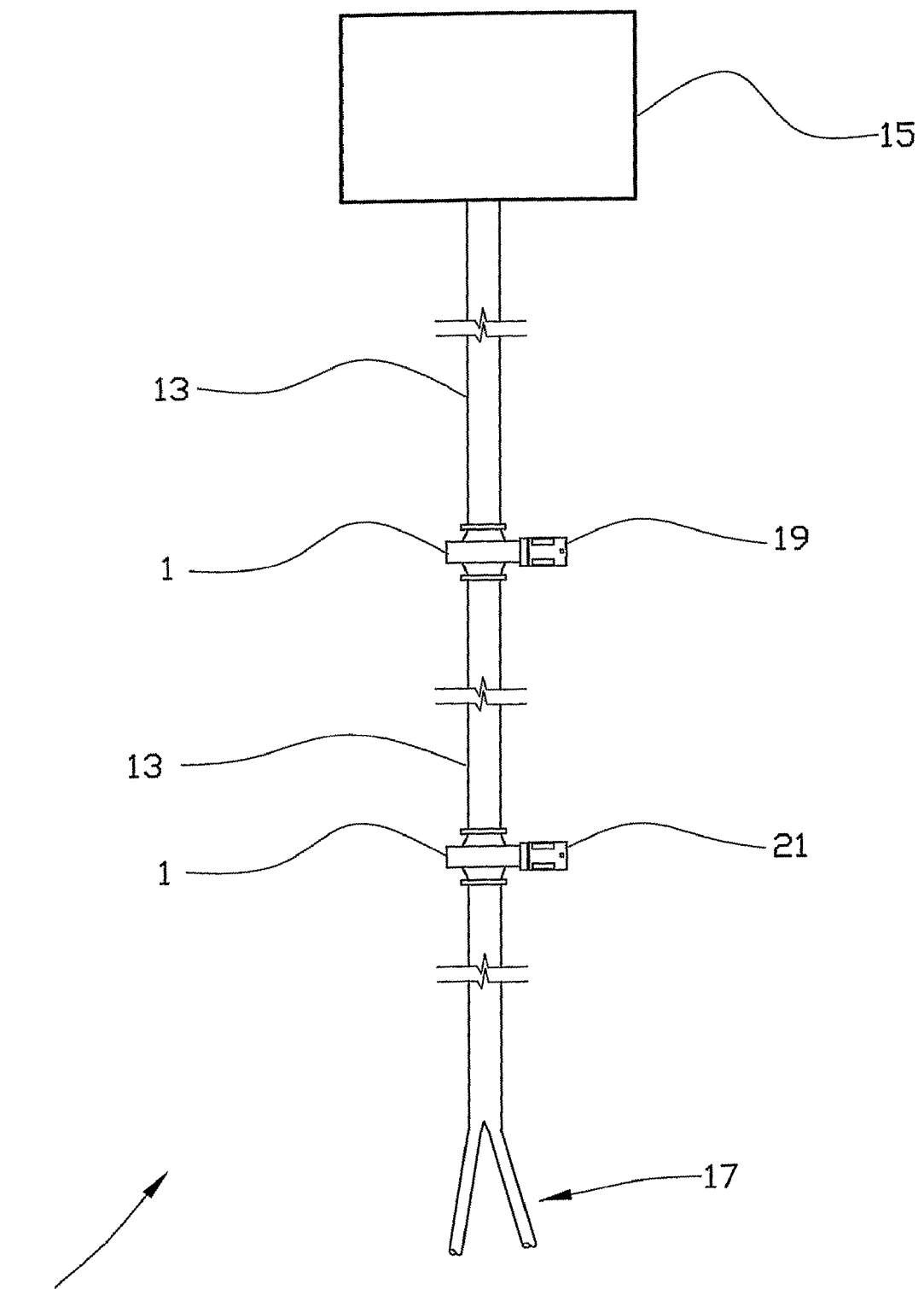
FIG. 8 shows the water supply system of FIG. 7, viewed from above.

Reference is made to the FIGS. 7 and 8. The figures are only principle drawings, which do not show the individual elements to scale, and which are only made to illustrate the main features of one aspect of the invention.

In the drawings the reference numeral 12 indicates a water supply system including a pipeline 13 which is connected at a first end portion to a drinking water source 15, and which is connected by its second end portion to a distribution pipeline network 17.

The drinking water source 15 may be, for example, a water treatment plant known per se.

In the pipeline 13 there are disposed two identical apparatuses 1 in the form of pumping devices. The pumping devices 1 are spaced apart both in the horizontal plane and in the vertical plane.

The purpose of the pumping device 1 is to reduce the pressure, which arises as a consequence of the difference in elevation between the drinking water source 15 and the lowerlying distribution pipeline network 17. Without the pumping devices 1 the pressure on the distribution pipeline network 17 could become too high.

A proportion of the energy that the fluid column or water flow has at the inlet to either one of the pumping devices 1 is consumed to drive the pumping devices 1. Thus, the pumping devices 1 cause a loss of energy from the water flow, in turn leading to reduced pressure downstream of either one of the pumps 1. The amount of energy extracted at either one of the pumps 1 could be controlled by, for example, a centrifugal brake (not shown) known per se.

By means of the pumps 1 the pressure at the distribution pipeline network 17 could therefore be adjusted to the desired level.

To be able to utilize the energy extracted from the water flow in the pipeline 13 by means of the pumping devices 1, these are each connected to a respective power generator 19, 21 of a kind known per se.

Thus, the pumps 1 will function both as a "pressure-reducing valve" and also as an energy source for a power generator in which the difference between the pressure available as a consequence of a difference in elevation between the drinking water source 15 and distribution network 17 and the pressure desired or required at the distribution pipeline network 17 is utilized for energy production. It will be understood that the pumping devices 1 could also be supplied with energy from an external energy source (not shown) and, thus, bring about a positive differential pressure in the fluid column, possibly pump the water up towards the drinking water source 15. The pumping device 1 could also work as a shut-off valve by the drive means 2 of the pump being retained from rotation so that at least a portion of the fluid column is prevented from moving within the pipeline 13.

Even though the pumps 1 are shown to be placed in series, a skilled person will understand that the pumps 1 could also be placed in parallel and that any number of pumps could be disposed as required and according to the pressure reduction desired. In cases in which the pressure at the distribution pipeline network 17 is not critical, the amount of energy extracted by means of the pumping devices 1 could be controlled with respect to the energy requirement.

A skilled person will also understand that the pipeline 13 could advantageously be provided with a so-called "bypass line" (not shown) which could lead the water flow, by means of valve devices for example, past either one of the pumps 1, so that the water flow could be maintained in connection with maintenance on one or both pump(s) 1.

Thereby the apparatus according to the present invention could surprisingly be used both as a pressure-reducing device and as a shut-off valve in addition to being usable as a pump and as an energy source for a generator for the production of electrical current.

As the pumps 1 are very easy to place into both new and existing fluid flow systems, and as substantial parts of the energy extracted from the water flow by means of the pumps could be utilized for electrical energy, the present invention represents a considerable resource and an environmental gain over the prior art, in which costly pressure-equalizing basins or pressure-reducing valves are used to adjust the pressure of a fluid column to a desired or required level. Thus, the use of energy, which could be extracted from a fluid flow by means of the present invention, represents use of energy, which is wasted today.

The invention claimed is:

1. An apparatus for use in controlling a differential pressure between a fluid column upstream and downstream of the apparatus, said apparatus comprising at least two impellers, each having a rotatable shaft provided with a plurality of vanes or blades, the impellers being disposed in a housing which constitutes a portion of a pipeline, said shafts communicating with a load, said apparatus is arranged for receiving the fluid column between the shafts of the impellers, whereby the velocity of the fluid column through the apparatus substantially corresponds to the velocity of the fluid column immediately adjacent to the impellers of the apparatus, and the impellers of the apparatus are arranged for providing a rotatable barrier for the fluid column in that at least one of the vanes or blades of each of the impellers is in substantially sealing contact with a first portion of the internal jacket surface of the housing, said barrier being influenced by said load to provide any predetermined differential pressure between the fluid column upstream and downstream of the apparatus, wherein at least one of the blades of each of the impellers is constantly in substantially sealing contact with an elongated dividing element which is disposed in a portion of the apparatus, said dividing element providing a partition between the impellers and extending past a straight line through said shafts.

2. The apparatus in accordance with claim 1, further comprising a longitudinal axis of the dividing element is substantially parallel to an axis extending between an inlet portion and an outlet portion of the apparatus.

3. The apparatus in accordance with claim 1, further comprising at least a portion of the dividing element is provided with a biconcave shape.

4. The apparatus in accordance with claim 1, the dividing element comprising at least one fluid column control element pivotally disposed at a portion of the dividing element to control of the distribution of the fluid column between the two impellers.

5. The apparatus in accordance with claim 1, said load comprising a generator for producing electrical energy.

6. A method for controlling a differential pressure in a fluid column located within a pipeline, said method comprising:
  integrating in the pipeline an apparatus which includes at least two impellers, either one comprising a rotatable shaft provided with a plurality of vanes or blades,
  disposing the impellers in a housing which constitutes a portion of the pipeline, said shafts communicating with a load, whereby the velocity of the fluid column through the apparatus substantially corresponds to the velocity of the fluid column immediately adjacent to the impellers of the apparatus, and the impellers of the apparatus are arranged for providing a rotatable barrier for the fluid column in that at least one of the vanes or blades of each of the impellers is in substantially sealing contact with a first portion of the internal jacket surface of the housing, said barrier being influenced by said load to provide any predetermined differential pressure between the fluid column upstream and downstream of the apparatus; and
  controlling the rotation of said impellers by the load communicating with the shafts of the impellers to provide any predetermined differential pressure between the pressures of the fluid column upstream and downstream of the apparatus.

7. The method in accordance with claim 6, further comprising producing electrical energy from the load.

8. The method in accordance with claim 6, further comprising including in the apparatus a dividing element for providing a partition between the impellers.

9. The method in accordance with claim 6, further comprising distributing the fluid between the impellers with the dividing element and a fluid column control element.

10. The method in accordance with claim 6, further comprising the steps of:
  integrating the apparatus in a pipeline which extends between a petroleum underground formation and a petroleum installation;
  conducting a petroleum fluid through the pipeline from the underground formation to the installation; and
  controlling the rotation of the impellers for reducing the pressure in the pipeline between the underground formation and the installation.

* * * * *